(12) United States Patent
Seger (10) Patent No.: US 7,392,161 B2
(45) Date of Patent: *Jun. 24, 2008

(54) IDENTIFYING A STATE OF A SYSTEM USING AN ARTIFICIAL NEURAL NETWORK GENERATED MODEL

(75) Inventor: Paul J. Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 10/947,934

(22) Filed: Sep. 23, 2004

(65) Prior Publication Data

US 2006/0074604 A1 Apr. 6, 2006
US 2007/0106485 A9 May 10, 2007

(51) Int. Cl.
*G06F 15/00* (2006.01)

(52) U.S. Cl. ........................... 702/189; 702/197

(58) Field of Classification Search ............... 702/189, 702/193, 197; 707/1, 101; 706/14, 20–30
See application file for complete search history.

(56) References Cited

U.S. PATENT DOCUMENTS

| 5,267,151 | A |  | 11/1993 | Ham et al. |  |
| 5,515,477 | A | * | 5/1996 | Sutherland | 706/41 |
| 6,334,121 | B1 | * | 12/2001 | Primeaux et al. | 706/62 |
| 6,574,754 | B1 |  | 6/2003 | Smith |  |
| 6,760,716 | B1 |  | 7/2004 | Ganesamoorthi |  |
| 2005/0132378 | A1 | * | 6/2005 | Horvitz et al. | 718/104 |

OTHER PUBLICATIONS

Elovici et al. 'Using Data Mining Techniques for Detecting Terror-Related Activities on the Web', Jan. 2004, UOSF Publication, pp. 1-13.*
Haro et al., 'Detecting and Tracking Eyes By Using Their Physiological Properties Dynamics, and Appearance', 2000, CVPR Publication, pp. 163-168.*

* cited by examiner

*Primary Examiner*—Eliseo Ramos-Feliciano
*Assistant Examiner*—Elias Desta
(74) *Attorney, Agent, or Firm*—Dan Shifrin (57) ABSTRACT

The state or condition of a system may be evaluated by comparing a set of selected parameter values, converted into a trial vector, with a number of model or exemplar vectors, each of which was represents a particular state or condition of a sample system. Examples of such conditions may include "good", "marginal", "unacceptable", "worn", "defective", or other general or specific conditions. Sets of parameter values from the system are converted into input vectors. Unprocessed vectors are then processed against the input vectors in an artificial neural network to generate the exemplar vectors. The exemplar vectors are stored in a memory of an operational system. During operation of the system, the trial vector is compared with the exemplar vectors. The exemplar vector which is closest to the trial vector represents a state which most closely represents the current state of the system. Thus, a high similarity between the trial vector and an exemplar vector which represent a "good" system is likely to have come from a "good" system.

36 Claims, 12 Drawing Sheets

IDENTIFYING A STATE OF A SYSTEM USING AN ARTIFICIAL NEURAL NETWORK GENERATED MODEL

RELATED APPLICATION DATA

The present invention is related to commonly assigned and co-pending U.S. application Ser. No. 10/947,692, entitled IDENTIFYING A STATE OF A DATA STORAGE DRIVE USING AN ARTIFICIAL NEURAL NETWORK GENERATED MODEL, filed on the filing date hereof, which application is incorporated herein by reference in its entirety.

TECHNICAL FIELD

The present invention relates generally to system diagnostics and, in particular, using an artificial neural network to generate a model representing one or more possible states of a system and comparing an actual state of the system to the model.

BACKGROUND ART

Numerous types of systems include automated processes to generate one or more parameters which may be used to evaluate the current state of the system. The automated process may also be used to improve system performance or even repair certain defects or faults. For example, a data storage drive, such as a tape drive, may include an adaptive equalizer with many finite impulse response (FIR) taps whose input coefficients are automatically modified to optimize system performance.

However, it may be difficult to assess the quality of the result of an automated process because of obscure relationships between the measured parameters and the system response. It will be appreciated that if the integrity of the parameter values is not verified, there is a risk that the automated process produces an undesirable system response. Thus, not only might the process fail to improve performance but, if the parameter values are undetectably invalid, may also cause the system to fail completely.

For example, in an adaptive equalizer of a tape drive, FIR tap values are computed from information captured from the storage drive. If the information is corrupted, or if execution of the algorithm which is used to compute the tap values is corrupted, the FIR tap values will be invalid. More specifically, a media defect or servo error may corrupt the captured information. Similarly, an overflow or underflow may occur during the execution of the FIR tap algorithm, resulting in tap values which bear no relation to the proper results. Or, rather than the captured information being invalid, the information may result in the creation of tap values which are outside the range of values which can be handled by the equalizer. In each of these circumstances, the invalid or improper condition of the tap values may be undetected.

Consequently, there remains a need for an automated process which provides an assessment of the quality of parameter values which are used to adjust the system.

SUMMARY OF THE INVENTION

The present invention provides an assessment the state or condition of a system. Examples of such conditions may include "good", "marginal", "unacceptable", "worn", "defective", or other general or specific conditions, depending on the specific system being evaluated and the desired specificity of the evaluation.

Sets of n parameter values each from a model system are converted into n-tuple input vectors. Unprocessed n-tuple vectors are then processed against the input vectors in an artificial neural network ("ANN") to generate a set of n-tuple exemplar vectors. The ANN preferably includes three stages, a global conditioning stage, a vector separation stage and a vector consolidation stage, to fine tune the creation of the exemplar vectors. Each exemplar vector will thereby represent a particular potential state or condition of the system. The exemplar vectors are stored in a memory of an operational system to be evaluated.

During operation of the system, a set of n selected parameter values are converted into an n-tuple trial vector. The trial vector is compared with the exemplar vectors. The exemplar vector which is closest, measured by the distance between the two, to the trial vector represents a state which most closely represents the current or actual state of the system. Thus, a high similarity between the trial vector and an exemplar vector which represent a "good" system is likely to have come from a "good" system. Conversely, a high similarity between the trial vector and an exemplar vector which represent an "unacceptable" system is likely to have come from a "unacceptable" system.

Optionally, the presence of predetermined states may be flagged or logged for follow-up attention. Additionally, if the distance between the trial vector and the closest exemplar vector is greater than a predetermined distance, the current state of the system may be a previously unknown state and the trial vector may subsequently be analyzed and used as another exemplar vector. Alternatively, such a situation may indicate that the parameters underlying the trial vector are invalid, thereby triggering a flag for immediate attention.

DETAILED DESCRIPTION OF THE PREFERRED EMBODIMENT

Overview

Figure 1:
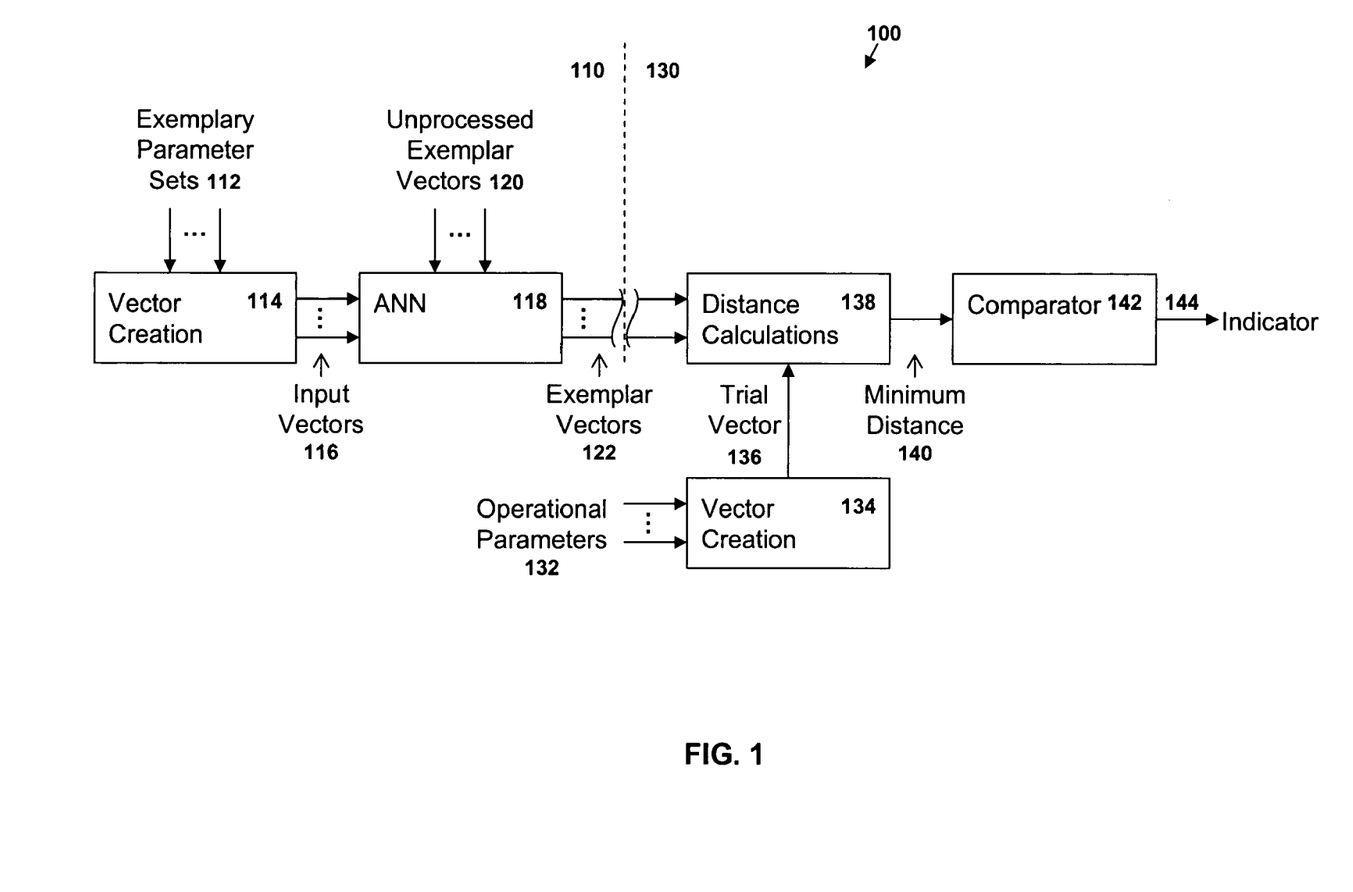
FIG. 1 is a summary block diagram of an embodiment of the present invention to generate exemplar vectors and evaluate trial vectors.

FIG. 1 is a block diagram of an embodiment 100 of the present invention which may be implemented in a system to evaluate performance parameters. The embodiment 100 includes two sections 110 and 130. In the first section 110, exemplar vectors, which represent potential states or conditions of a system to be evaluated, are generated from exemplary parameter sets. In the second section 130, implemented in the system itself, a trial vector is generated from actual parameters collected from the system during its normal operation and compared to the exemplar vectors. The exemplar vector which most closely matches the trial vector provides a representation of the current state of the system.

The first section 110 receives one or more sets 112 of parameters in a module 114, each set 112 representing a potential state of the system. Such states may be as general as "good", "marginal", "unacceptable" and "defective". Alternatively, the states may be as specific as "worn", "low tape tension", "excess media speed", etc. The module 114 converts the parameter sets 112 into vectors 116 which are input into an artificial neural network ("ANN") 118. Also input into the ANN 118 are one or more unprocessed vectors 120. the ANN 118 processes the unprocessed vectors 120 and outputs a like number of exemplar vectors 122.

The second section 130, implemented in the system to be evaluated, receives one or more parameters 132 in a module 134 while the system is in operation, the parameters 132 representing the current state of the system. The module 134 converts the parameters 132 into a trial vector 136 which is input into a calculator 138 along with the exemplar vectors 122. The calculator 138 determines which exemplar vector has the least distance to the trial vector and how close the trial vector 136 is to that "closest" exemplar vector 122. This minimum distance 140 may be compared in a comparator 142 to a predetermined value. If the minimum distance 140 is less than the value, the parameters 132 from which the trial vector was created may be deemed to be valid and the closest exemplar vector 122 may be deemed to be a reasonable representative of the current state of the system. Thus, the general condition of the system may be determined to be "good", "marginal", "unacceptable" or "defective" or certain problems may be specifically identified. By contrast, if the minimum distance 140 is greater than the value, the parameters 132 from which the trial vector was created may be deemed to be invalid (or represent a condition not yet experienced in the system). In either event, an appropriate indicator 144 may be generated and logged or flagged for maintenance or a warning.

Exemplar Vector Creation

Figure 2:
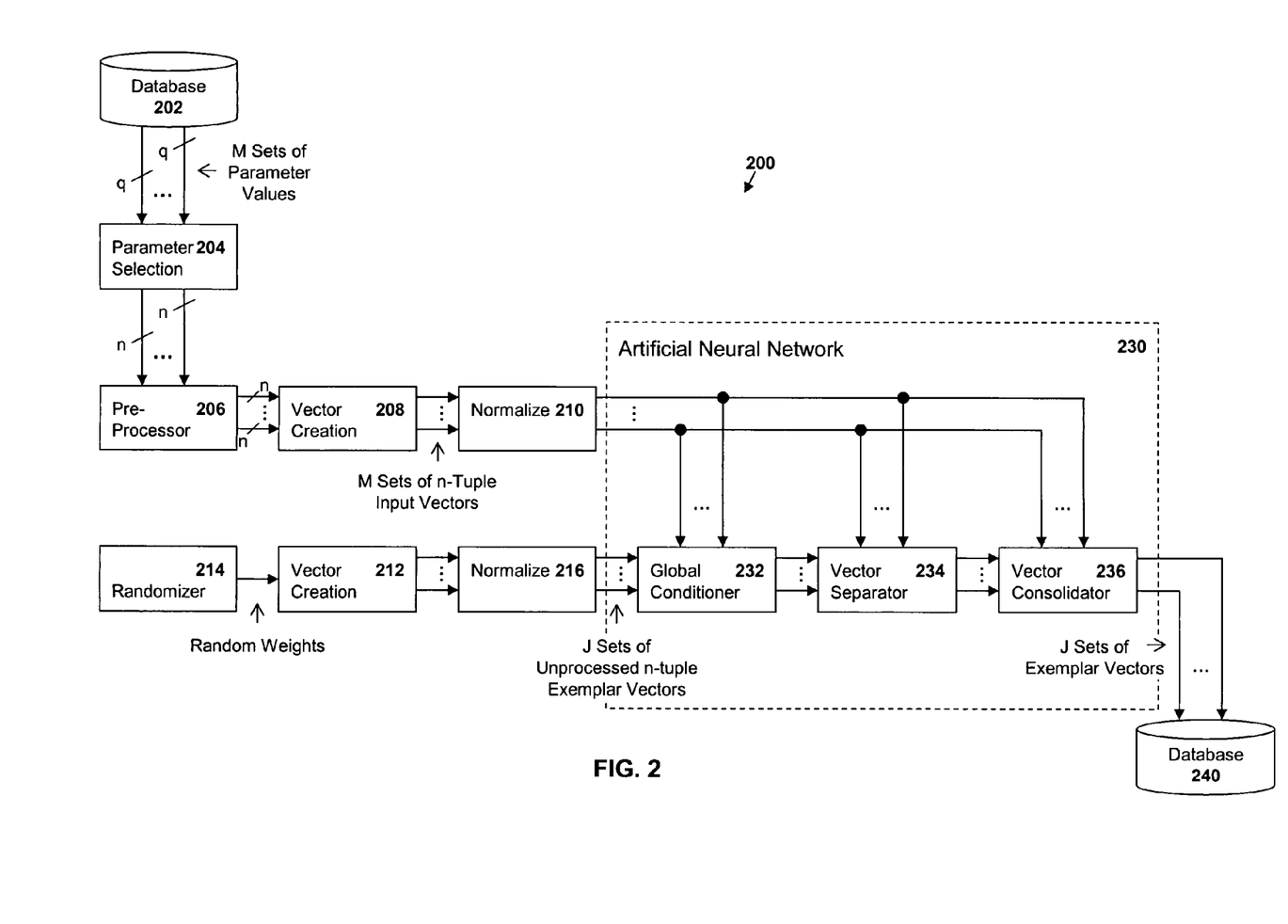
FIG. 2 is a block diagram of an embodiment of the present invention to generate exemplar vectors.

FIG. 2 illustrates a block diagram of an apparatus 200 of the present invention which may be implemented to generate exemplar vectors. After deciding which parameter or parameters are to be evaluated, sets of the parameters are obtained, each set having parameter values which, in combination (if more than one parameter is used), represent a particular state or condition of the system. Referring again to the example of an adaptive equalizer for a data storage drive, the FIR filter may have 17 taps. If the equalizer is the "system" to be evaluated, the 17 tap coefficients may be used as the parameters. A test storage drive may be put into operation and, when the equalizer is functioning properly, the 17 coefficient values may be recorded and stored, such as in a database 202, as one set of parameters which represent a "good" state. Because other combinations of tap coefficients may occur when the equalizer is operating properly, such other sets of coefficient values may be recorded and stored to represent a "good" state. Similarly, the test drive may intentionally be set to operate in a marginal manner and the resulting tap coefficients recorded and stored to represent a "marginal" state. As with the "good" states, there may be different circumstances which result in a "marginal" state and the various other sets of coefficients may be recorded and stored. In a like manner, sets of parameter values may be recorded and stored to represent "unacceptable" states as well as other general and specific states of interest. It will be appreciated that references in this description to a data storage drive, an equalizer and FIR tap values are merely illustrative and are not meant to be limiting. The present invention may be implemented with numerous systems which have measurable parameters. It should also be noted that it is not necessary that the parameters have a physical relationship or dependency to each other.

Depending upon the particular system to be evaluated, not all of the available parameters may be necessary to obtain a satisfactory evaluation. For example, of the 17 tap coefficients in the exemplary equalizer, only three or four may be sufficient to represent the system states of interest. Consequently, the three or four (or some other number) of the most significant parameters may be selected 204 for further processing resulting in a more manageable sparse representation of the system parameters. Computations and analysis are simplified with only an insignificant reduction in accuracy. The selected parameters are preferably those which have the greatest effect on system response. In such a manner, q parameter values in each of M parameter sets which have been recorded and stored in the database 202 may be reduced to n parameter values in the optional parameter selection 204 module.

In some systems, there may be some ambiguity associated with the parameters, thereby obscuring the relationship between the parameter values and the physical "world" which is to be affected. For example, it may be difficult to determine what is happening within the equalizer merely by looking at FIR tap coefficient values because the tap values are a time domain representation of the frequency domain result. Thus, it may be desirable to convert the values from the time domain to the more recognizable state of the frequency domain, such as by using a Discrete Fourier Transform. Such a conversion, or other comparable operation, may be accomplished in an optional pre-processor 206. The pre-processor 206 may also be used when the raw parameter values are samples in time, each of which provides little indication of the system operation. Thus, pre-processing may generate a significantly more meaningful representation of the system state. It will be appreciated that the pre-processor 206 may be configured to perform various operations, depending upon the system, the form of the parameters and the desired form of the output. Thus, the Discrete Fourier Transform noted above is merely an example of one such operation and is not meant to be limiting.

Figure 3:
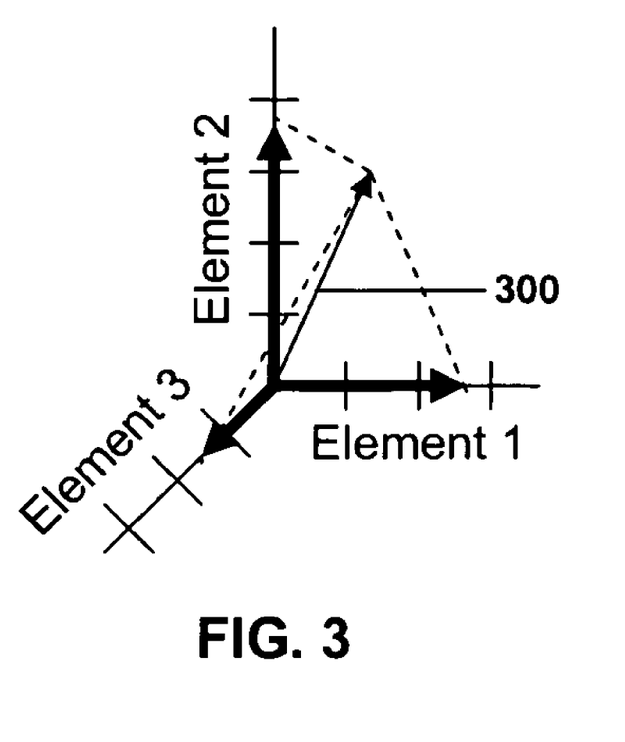
FIG. 3 is a plot of a 3-tuple exemplar vector.

The M sets of n parameter values are then processed by a vector creator 208 to generate M n-tuple vectors. FIG. 3 illustrates an example of a vector 300 in which n=3. Each of the three vector elements is plotted along a corresponding unit vector in n-dimensional space and the resulting vector 300 has both a magnitude and a direction in such n-space.

In a further optional operation, the magnitudes of the vectors may be normalized to a common scaled magnitude (such as 1) in another unit 210 of the apparatus 200 of the present invention. Normalization removes amplitude (size) variations among the vectors while preserving their intrinsic shapes, thereby facilitating the comparison and matching of vectors in subsequent operations. As a result, the vectors will differ only in their direction and vector-to-vector variability is reduced without compromising the shape described by the components of the vector. The normalized vectors, or the vectors created in the vector creator 208 if normalization is not performed, are the M n-tuple input vectors for the next stage, an artificial neural network 230.

In addition to the input vectors whose creation has just been described, unprocessed exemplar vectors are also created for input to the ANN 230 for processing. J n-tuple unprocessed vectors are created in a second vector creator 212 with random initial weights provided by a randomizer 214 or other comparable component. The unprocessed vectors may be normalized in a normalizer 216 to the same common magnitude as the input vectors. The vector creators 208 and 212 need not be separate components but may comprise a single component. Similarly, the normalizers 210 and 216 need not be separate components but may be a single component.

Both the input vectors and the unprocessed exemplar vectors are input to the ANN 230. The ANN 230 provides an unsupervised learning process, such as that which is used to calculate a Kohonen self-organizing feature map ("SOFM"). In general, a number of weight matrix vectors are randomly initialized and an output node is associated with each weight matrix vector. Input vectors are repeatedly presented to the weight matrix vectors. The difference between the weight vectors and the input vectors is fed back to the network and the weights are progressively adjusted. After a predetermined number of iterations (epochs), each input vector becomes associated with an output node, without actually having specified the output node. The details of SOFMs and related processes are well known and need not be described further herein.

In a first stage, global conditioning 232, of the ANN 230, the unprocessed exemplar vectors are arrayed in a field which also contains the input vectors. However, because of their random initial weights, some or all of the unprocessed exemplar vectors may be remote from any input vector and therefore outside a range of probable values (such range being roughly defined by the M input vectors). The first stage 232, therefore, rearranges the unprocessed exemplar vectors within the range of probable values. Referring to the flow chart of FIG. 4, beginning with the initial configuration of J unprocessed exemplar vectors (step 400; see also FIG. 5), an epoch counter is initialized (step 402) to the number of epochs over which each unprocessed exemplar vector is to be processed during global conditioning. A vector counter is similarly initialized (step 404) to the number of input vectors used in the process. it will be appreciated that any of the various counters used in the various routines of the present invention may instead count-up to be subsequently incremented. An input vector (such as $I_0$) is then selected (step 406), an exemplar vector counter is initialized (step 408) to the number of exemplar vectors to be processed, and an exemplar is selected to be processed (step 410). The selected input vector is then applied to the selected unprocessed exemplar vector (step 412) and the selected unprocessed exemplar vector is updated. Each of the n components of the selected unprocessed exemplar vector is adjusted by a fraction a, of the difference between the selected input vector and the selected unprocessed exemplar vector (step 414), thereby shifting the location of the selected unprocessed exemplar vector closer to the selected input vector (as indicated by the arrows in FIG. 5). For example, if $n_i$ and $m_i$ represent a vector component of an exemplar vector and an input vector, respectively, the adjustment to $n_i$ will be $n_{updated} n_i = \alpha(m_i - n_i)$.

Figure 4:
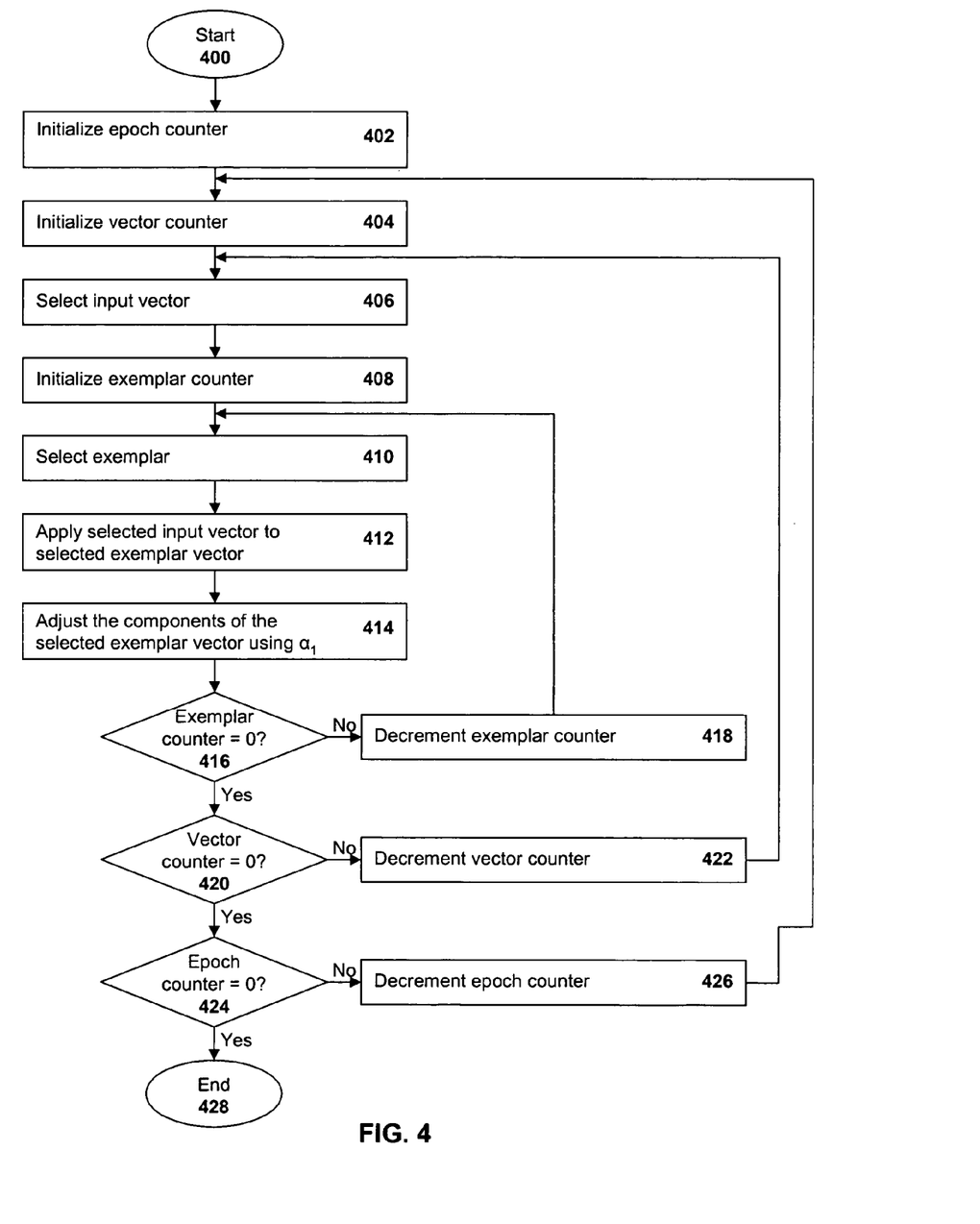
FIG. 4 is a flow chart of the global conditioning stage in the process of generating exemplar vectors.
Figure 5:
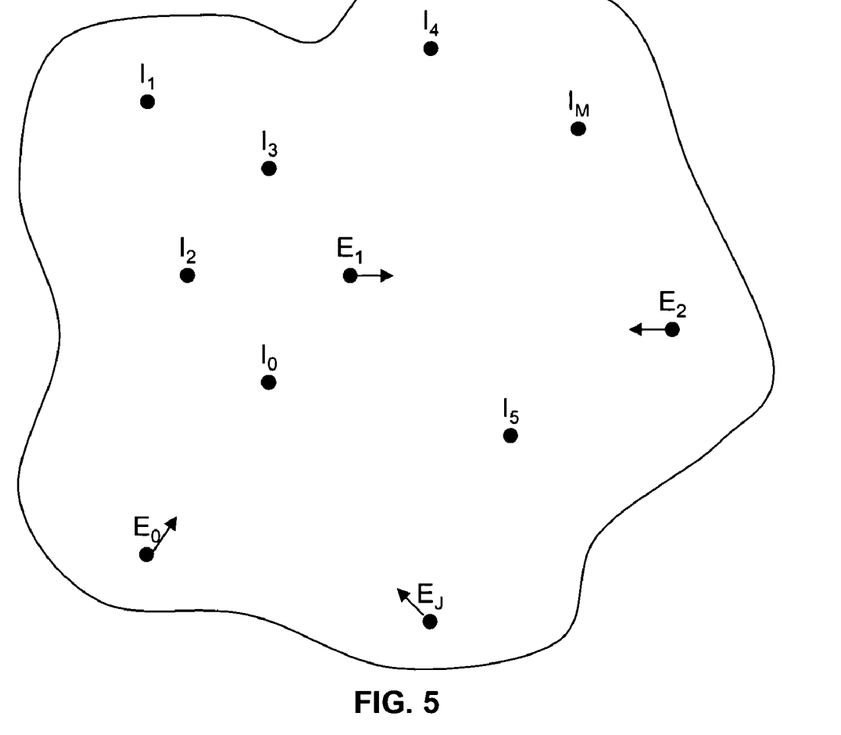
FIG. 5 is a vector map of input vectors and unprocessed exemplar vectors during the global conditioning stage of exemplar vector creation.
Figure 6:
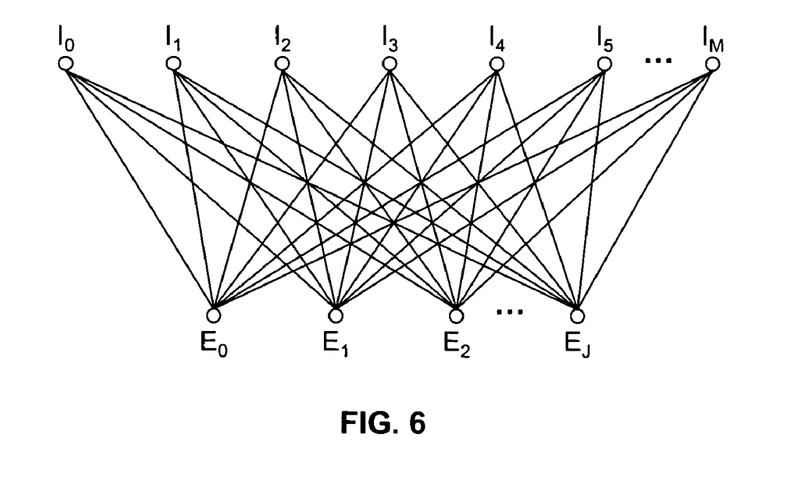
FIG. 6 is a representation of the application of the input vectors to the exemplar vectors.

This adjusting step 414 will be referred to as vector "updating" in the descriptions below of the vector separation 234 and vector consolidation 236. If the exemplar counter is not yet zero (step 416), the exemplar counter is decremented (step 418) and the process repeats by applying the same selected input vector to a newly selected exemplar vector (steps 410-416). If the exemplar counter has reached zero, a determination is made whether the selected input vector has been applied to all of the exemplar vectors (step 420). If not, the input vector is decremented (step 422), a new input vector is selected (step 406) and the process repeats (steps 408-422) until all of the input vectors have been applied to all of the exemplar vectors during the current epoch (as illustrated generically in FIG. 6). Then, a determination is made whether the vectors are to be processed through further epochs (step 424). If so, the epoch counter is decremented (step 426) and the process repeats (steps 404-424) until the epoch counter reaches zero, at which time global conditioning is complete (step 428). It should be noted that the order of some of the above described steps may be reversed or changed, with appropriate modifications to later steps in the process. It should also be noted that the fraction $\alpha_1$ need not be a constant but may be adjusted as the global conditioning progresses, thereby automatically fine tuning the process.

Figure 7:
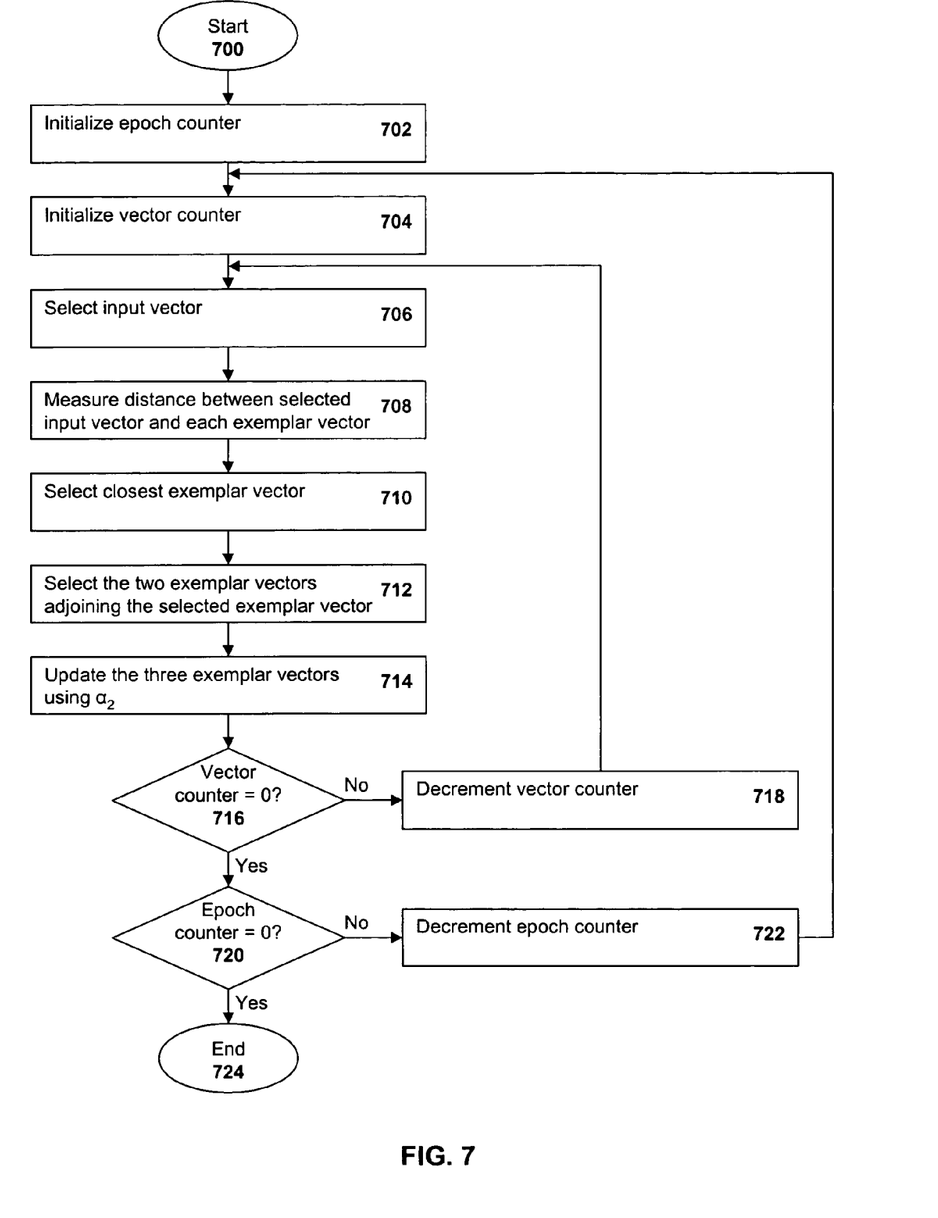
FIG. 7 is a flow chart of the vector separation stage in the process of generating exemplar vectors.
Figure 8:
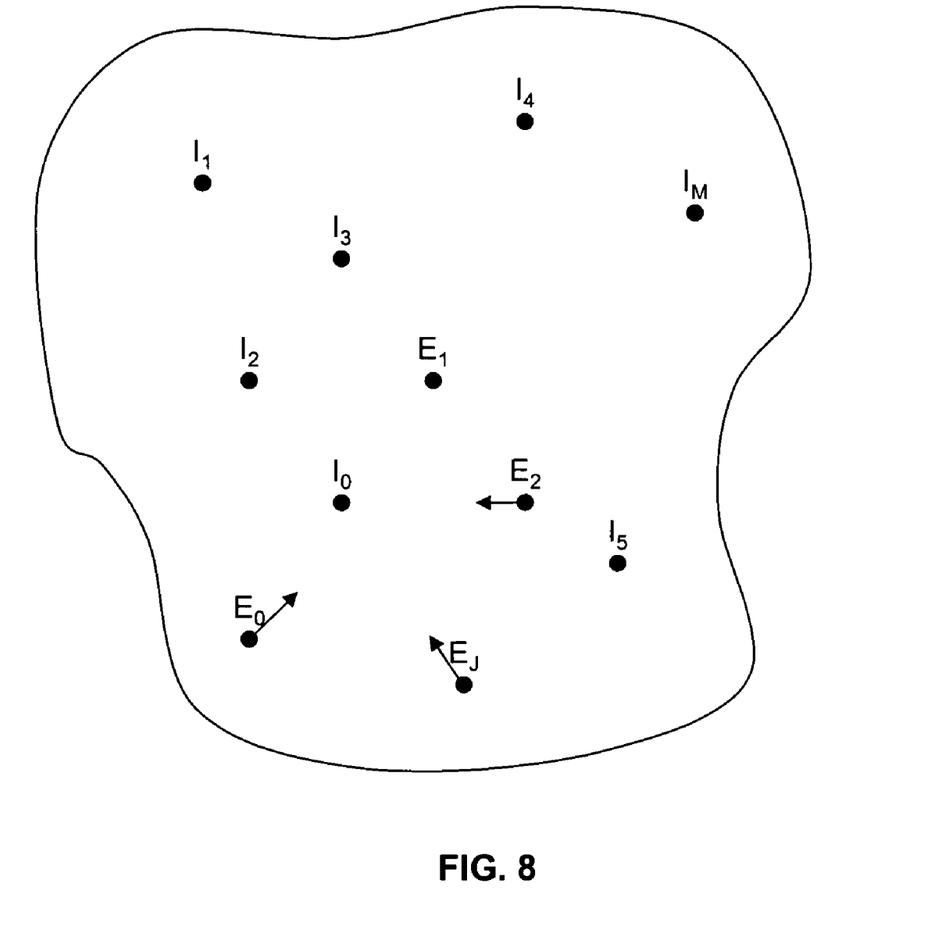
FIG. 8 is a vector map of input vectors and conditioned exemplar vectors during the vector separation stage of exemplar vector creation.

In a second stage, vector separation 234, of the ANN 230, the conditioned exemplar vectors undergo further processing. Referring to the flow chart of FIG. 7, beginning with the ending configuration of conditioned exemplar vectors (step 700; see also FIG. 8), an epoch counter is initialized (step 702) to the number of epochs over which each unprocessed exemplar vector is to be processed during vector separation. A vector counter is similarly initialized (step 704) to the number of input vectors used in the process. An input vector (such as $I_0$) is selected (step 706). Next, the distance from the selected input vector to each exemplar vector is calculated (step 708). The distance may be calculated as the Euclidean distance, such as by finding the square root of the sum of the squares of the difference of each of the n components of the two vectors. The exemplar vector which is the closest to the selected input vector is selected (step 710) as are the two exemplar vectors which adjoin the selected exemplar vector (step 712). In FIG. 8, exemplar vector $E_J$ is closest to the selected input vector $I_0$; the two adjoining vectors are $E_0$ and $E_2$. These three exemplar vectors are updated (step 714) using an adjustment factor $\alpha_2$ which may be the same or different from the adjustment factor $\alpha_1$ used during global conditioning. The adjustment factor may itself also be adjusted as the epochs continue. If the vector counter has not yet reached zero (step 716), the counter is decremented (step 718) and the process is repeated with a new input vector (steps 706-718). If the vector counter has reached zero, a determination is made whether the process is to be performed through further epochs (step 720). If so, the epoch counter is decremented (step 722) and the process repeats (steps 704-720) until the epoch counter reaches zero, at which time the vector separation ends (step 724).

Figure 9:
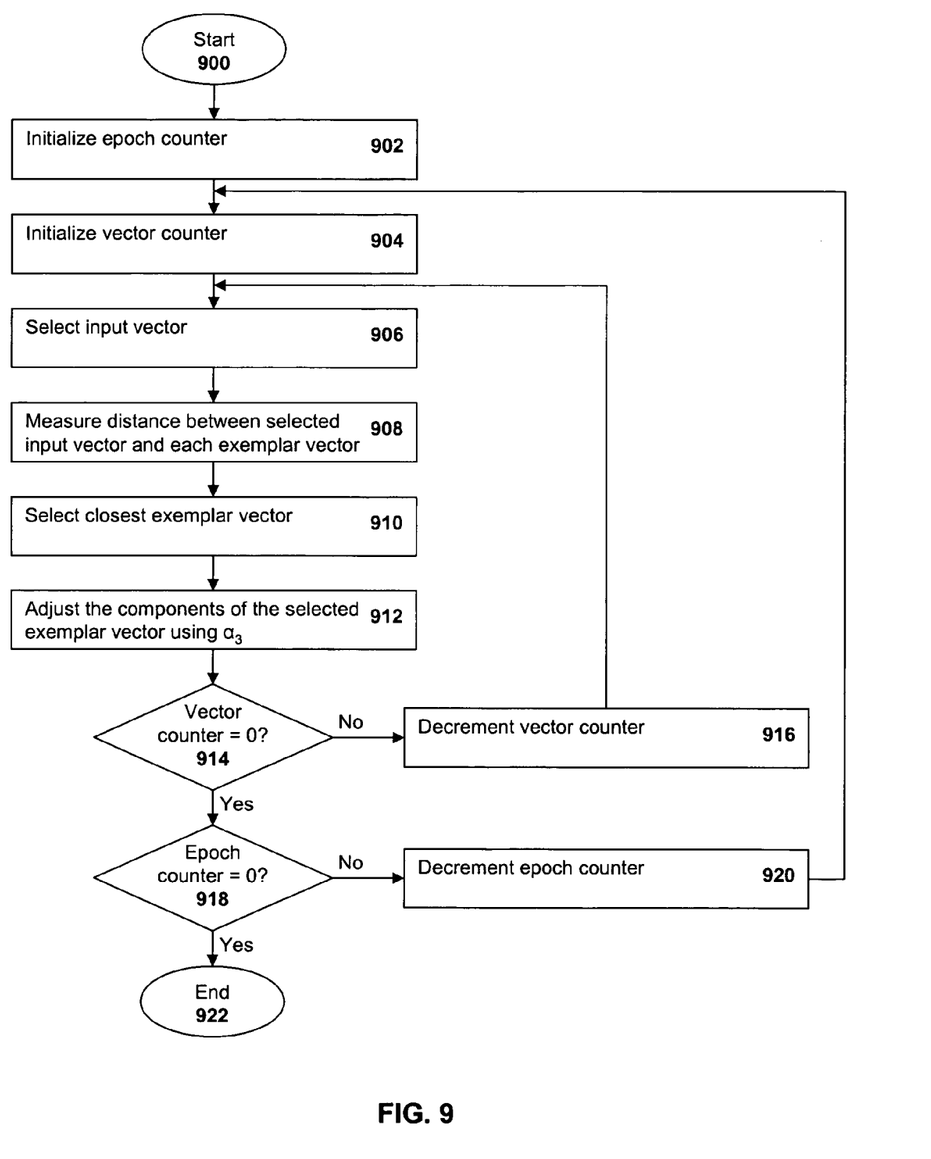
FIG. 9 is a flow chart of the vector consolidation stage in the process of generating exemplar vectors.
Figure 10:
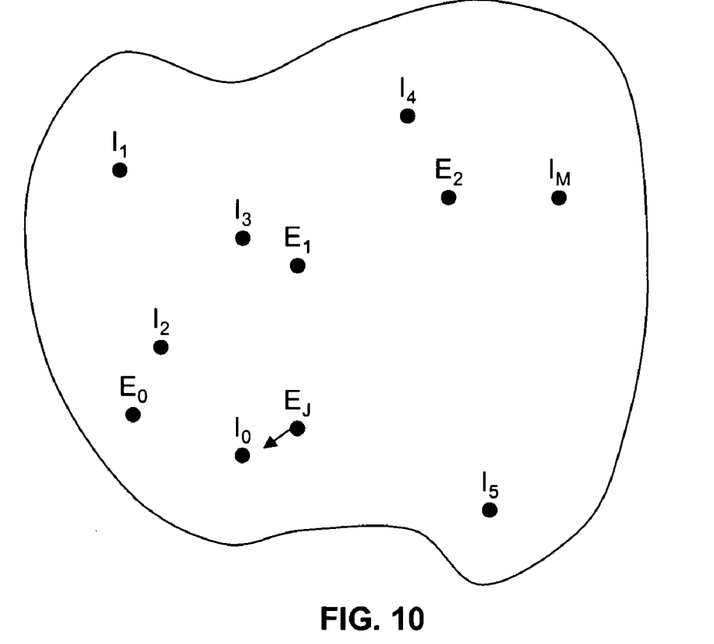
FIG. 10 is a vector map of input vectors and separated exemplar vectors during the vector consolidation stage of exemplar vector creation.
Figure 11:
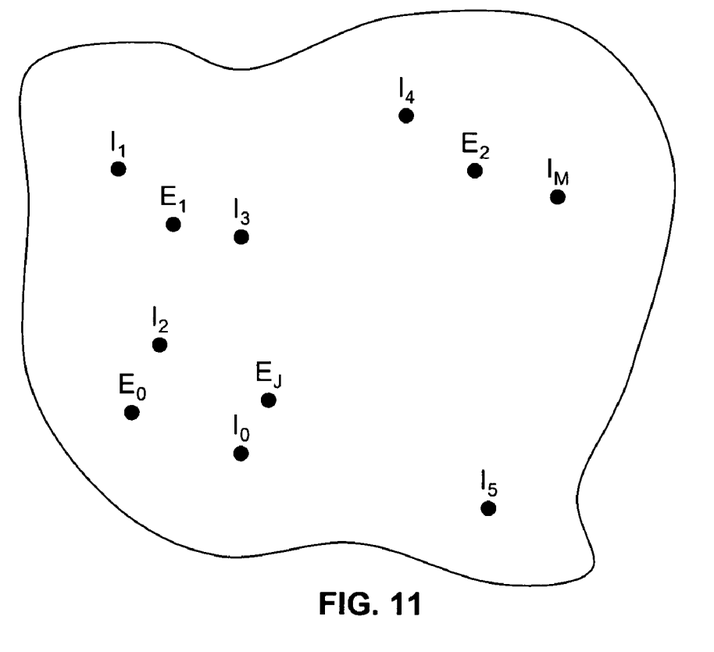
FIG. 11 is a vector map of input vectors and consolidated exemplar vectors following the vector consolidation stage of exemplar vector creation.

In a third, vector consolidation 236, of the ANN 230, the separated exemplar vectors undergo still further processing. Referring to the flow chart of FIG. 9, beginning with the ending configuration of separated exemplar vectors (step 900; see also FIG. 10), an epoch counter is initialized (step 902) to the number of epochs over which separated exemplar vectors are to be processed during vector consolidation. A vector counter is similarly initialized (step 904) to the number of input vectors used in the process. An input vector (such as $I_0$) is then selected (step 906) and the distance from the selected input vector to each exemplar vector is calculated (step 908). As before, the distance may be calculated as the Euclidean distance between the selected input vector and an exemplar vector. The exemplar vector which is the closest to the selected input vector is selected (step 910); in FIG. 10, exemplar vector $E_J$ is closest to the selected input vector $I_0$. The closest exemplar vector is updated (step 912) using an adjustment factor $\alpha_3$ which may be the same or different from the adjustment factors $\alpha_1$ and $\alpha_2$ used during global conditioning and vector separation. Similarly, the adjustment factor may itself be adjusted as the epochs continue. If the vector counter has not yet reached zero (step 914), the counter is decremented (step 916) and the process is repeated with a different input vector (steps 906-916). If the vector counter has reached zero, a determination is made whether the process is to be performed through further epochs (step 918). If so, the epoch counter is decremented (step 920) and the process repeats (steps 904-920) until the epoch counter reaches zero, at which time vector consolidation ends (step 922) with a final alignment of the J exemplar vectors with the M input vectors, as illustrated in FIG. 11. In this final alignment, each exemplar vector will have moved to the approximate mean squared center of a group of input vectors, thereby associating each exemplar vector with a group of input vectors which represent a state or condition of the system to be evaluated. Thus, each exemplar vector is an approximate model for one particular system state.

The finalized exemplar vectors processed through the ANN 230 are then recorded or stored, such as in a database 240.

System Evaluation

Figure 12:
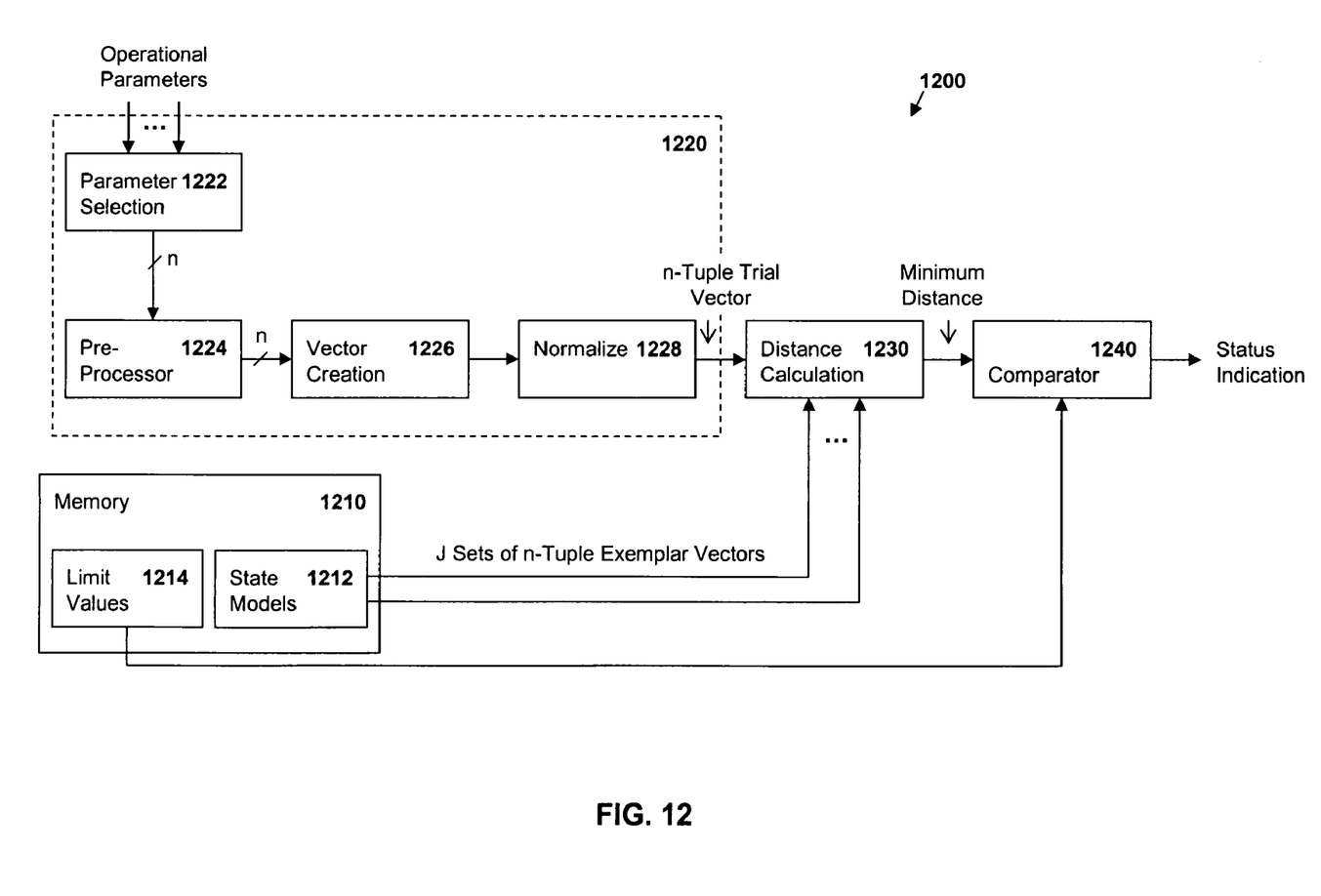
FIG. 12 is a block diagram of a system to be evaluated in accordance with the present invention.

FIG. 12 is a block diagram of a system 1200 to be evaluated and provides an overview of the evaluation process. State models 1212, in the form of the exemplar vectors previously obtained, are stored in a memory 1210 of the system 1200. One or more limit values 1214 are also stored in the memory 1210. Parameter values obtained from the system during its operation are processed by a processor 1220 to generate an n-tuple trial vector. The processor 1220 may include a module 1222 to select which of the operational parameters are actually included as components in the trial vector. For example, of 17 FIR taps in the exemplary storage drive, three or four of the most significant may be selected for further processing. And, as in the case of exemplar vector creation described above, pre-processing 1224 may be performed to remove ambiguities. The selected parameters are then used to create a trial vector 1226 which is preferably normalized 1228 to the same magnitude to which the exemplar vectors are normalized.

Figure 13:
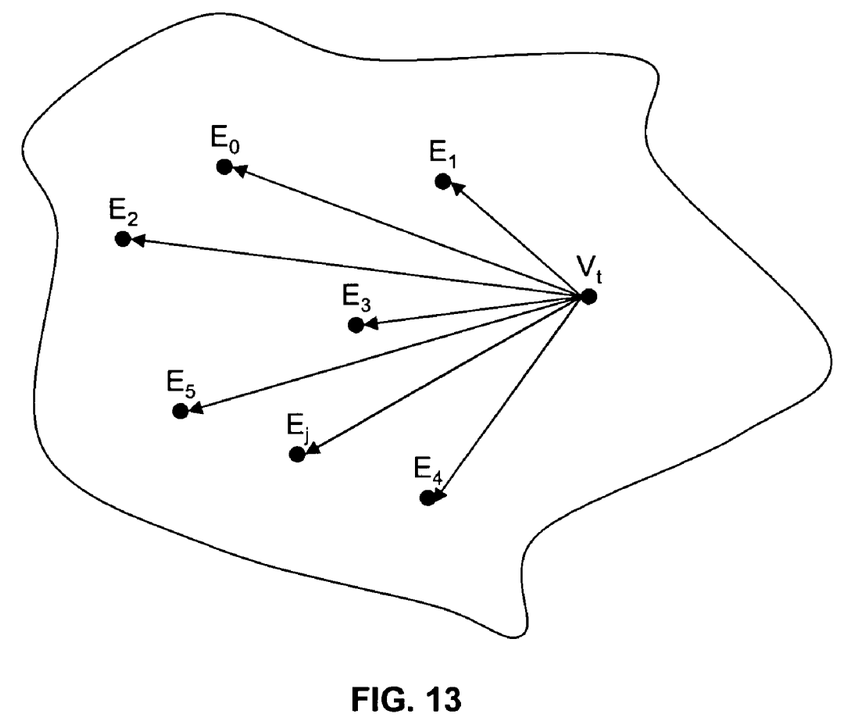
FIG. 13 is a vector map of a trial vector and exemplar vectors.

The trial vector and the exemplar vectors 1212 are input to a distance calculator 1230 which calculates the distance between the trial vector and each exemplar vector and determines which exemplar is the least distance to the trial vector. In FIG. 13, the exemplar vector $E_1$ is closest to the trial vector $V_r$. The minimum distance (that is, the distance between the trial vector and the closest exemplar vector, also known as the "activation value") is output and compared in a comparator 1240 with a first predetermined limit value 1214. If the minimum distance is less than the limit value, the operational parameters may be considered valid and representative of the current state of the system 1200. The minimum distance indicates the degree of similarity between the trial vector and the closes exemplar vector. A high degree of similarity to an exemplar vector which represents a "good" system indicates that the current state of the system is most likely also "good". Conversely, a high degree of similarity to an exemplar vector which represents an "unacceptable" system indicates that the current state of the system is most likely also "unacceptable". Moreover, if the minimum distance is greater than the predetermined limit, the operational parameters may be considered invalid. The evaluation result may be rejected and the system directed to repeat the evaluation, post an error or log the event for later referral by a technician. Additionally, if the minimum distance is greater than the predetermined limit but the operational parameters are, in fact, determined to be valid, the trial vector may itself be recorded and included with the exemplar vectors as a model representing a previously unrepresented state of the system 1200.

Even more specific evaluation may also be performed. For example, if the minimum distance or activation value is less than a second predetermined limit (which is less than the first limit), the activation value may be logged. If the minimum activation value is greater than the second predetermined limit, a system calibration or other comparable operation may be initiated. And, if the activation value is greater than a third predetermined limit (which is greater than the second limit), an alarm may be activated.

EXAMPLE

Figure 14:
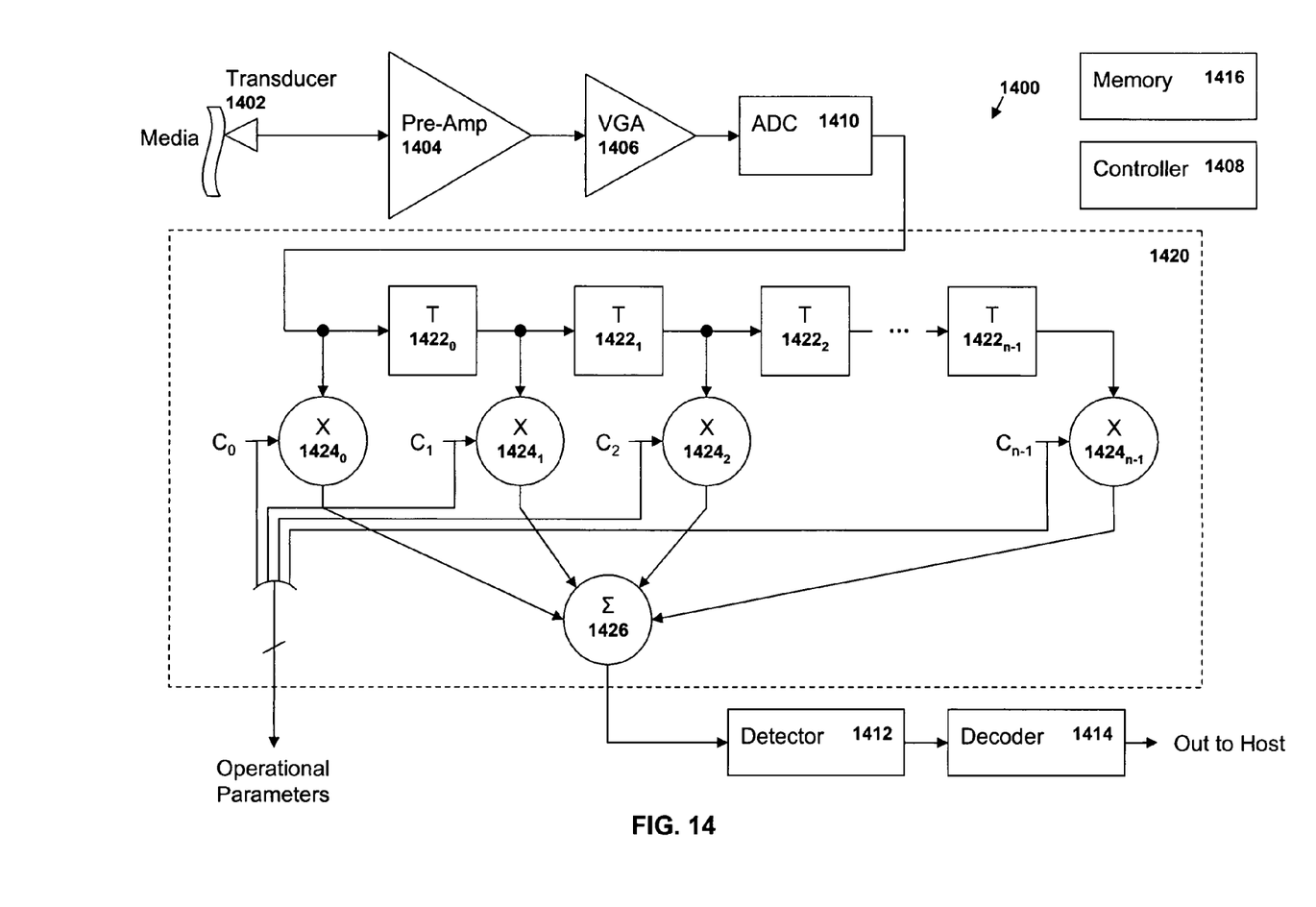
FIG. 14 is a block diagram of a data storage drive having FIR tap values to be evaluated in accordance with the present invention.

FIG. 14 is a block diagram of a data storage drive 1400, such as a magnetic tape drive, optical disc drive, magnetic disk drive or the like. A transducer 1402 detects transitions representing stored data and recorded on a media, such as magnetic tape, an optical disc or a magnetic disk, and converts the transitions into an analog signal. Typically, a pre-amp 1404 boosts the amplitude of the signal which is then processed by a variable gain amplifier 1406 under the control of a processor or controller 1418. A sampler, such as an analog-to-digital converter 1410 converts the analog signal into a digital signal. A signal processor, such as an adaptive equalizer 1420, may be used to shape the signal before a detector 1412, such as a sampled amplitude sequence detector, detects likely transition sequences. The detector 1412 sends the sequences to a decoder which reproduces the original data and transmits it to a host device.

As is known, the equalizer 1420 operates by applying a number n of coefficients $C_0$-$C_{n-1}$ to the input signal delayed by delay registers $1422_0$-$1422_{n-1}$ through multipliers $1422_0$-$1422_{n-1}$. The resulting n signals are summed in a summer 1426 before being transmitted to the detector 1412. Through a feedback process, the controller 1418 adaptively adjusts the coefficients to optimize the signal. In order to evaluate the performance of the equalizer 1400, the coefficient values (operational parameters) may be sent to the processor 1220 (FIG. 12) and converted into a trial vector in the manner described above.

The controller 1408, or other comparable component, includes or accesses a memory 1416 in which are stored the exemplar vectors created as described above and which represent models of various possible states of the drive 1400. In operation, programmed instructions direct the processor or controller 1418 to calculate the distance between the trial vector and each stored exemplar vector. The exemplar vector which is the closest to the trial vector most closely represents the current state or condition of the drive 1400.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for detecting a state of a system, comprising:
generating a plurality J of n-tuple exemplar vectors representative of potential states of a system;
operating the system;
generating an n-tuple trial vector from n parameters representing an actual state of the system;
of the J exemplar vectors, identifying an exemplar vector K which is closest to the trial vector, the distance from the trial vector to the identified exemplar vector K being an activation value;
whereby, if the activation value is less than a first predetermined value, the actual state of the system is characterized by the exemplar vector K.

2. The method of claim 1, wherein generating the exemplar vectors comprises:
initializing a plurality J of n-tuple unprocessed exemplar vectors with random values;
globally conditioning the J unprocessed exemplar vectors;
separating the conditioned exemplars; and
consolidating the separated exemplar vectors.

3. The method of claim 2, wherein globally conditioning the J unprocessed exemplar vectors comprises:
sequentially applying a plurality M of input vectors to the J unprocessed exemplar vectors;
updating the J unprocessed exemplar vectors by a factor of $\alpha_1$; and
repeating the applying and updating steps over a predetermined number $e_1$ of epochs.

4. The method of claim 2, wherein separating the conditioned vectors comprises:
sequentially applying the plurality M of input vectors to the J conditioned exemplar vectors;
of the J conditioned exemplar vectors, selecting the conditioned exemplar vector which is closest to the currently applied input vector;
updating the selected conditioned exemplar vector and a predetermined number of adjoining conditioned exemplar vectors by a factor of $\alpha_2$; and
repeating the applying, selecting and updating steps over a predetermined number $e_2$ of epochs.

5. The method of claim 2, wherein consolidating the separated vectors comprises:
sequentially applying the plurality M of input vectors to the J separated exemplar vectors;
of the J separated exemplar vectors, selecting the separated exemplar vector which is closest to the currently applied input vector;
updating the selected conditioned exemplar vector by a factor of $\alpha_3$; and
repeating the applying, selecting and updating steps over a predetermined number $e_3$ of epochs.

6. The method of claim 1, further comprising normalizing each unprocessed exemplar vector and the trial vector to a predetermined magnitude.

7. The method of claim 1, wherein identifying the exemplar vector K which is closest to the trial vector comprises calculating the Euclidean distance between each exemplar vector and the trial vector.

8. The method of claim 1, whereby, if the activation value is greater than the first predetermined value, the trial vector is invalid.

9. The method of claim 1, further comprising:
if the activation value is less than a second predetermined value, the second predetermined value being less than the first predetermined value, logging the activation value;
if the activation value is greater than the second predetermined value, initiating a system calibration; and
if the activation value is greater than a third predetermined value, the third predetermined value being greater than the second predetermined value and less than the first predetermined value, setting an alarm.

10. A method for detecting a state of a system, comprising:
operating the system;
generating an n-tuple trial vector from n parameters representing an actual state of the system;
retrieving a plurality of n-tuple exemplar vectors from a system memory, each exemplar vector representing a potential state of the system; and
of the J exemplar vectors, identifying an exemplar vector K which is closest to the trial vector, the distance from the trial vector to the identified exemplar vector K being an activation value;
whereby, if the activation value is less than a first predetermined value, the actual state of the system is characterized by the exemplar vector K.

11. The method of claim 10, further comprising normalizing the trial vector to a predetermined magnitude.

12. The method of claim 10, wherein determining which exemplar vector K is closest to the trial vector comprises calculating the Euclidean distance between each exemplar vector and the trial vector.

13. The method of claim 10, whereby, if the activation value is greater than the first predetermined value, the trial vector is invalid.

14. The method of claim 10, further comprising:
if the activation value is less than a second predetermined value, the second predetermined value being less than the first predetermined value, logging the activation value;
if the activation value is greater than the second predetermined value, initiating a system calibration; and
if the activation value is greater than a third predetermined value, the third predetermined value being greater than the second predetermined value and less than the first predetermined value, setting an alarm.

15. An apparatus for detecting a condition of a system, comprising:
a memory operable to store a plurality J of n-tuple exemplar vectors representative of potential states of a system;
the memory further operable to store a first predetermined value;
an input coupled to receive a plurality n of current parameter values from the system;
means for generating an n-tuple trial vector from the n parameter values;
a processor operable to determine a distance between the trial vector and each exemplar vector;
the processor further operable to identify an exemplar vector K which is the least distance to the trial vector, the least distance comprising an activation value; and
a comparator operable to compare the activation value with the first predetermined value, whereby if the activation value is less than the first predetermined value, the current state of the system is characterized by the exemplar vector K.

16. The apparatus of claim 15, the means for generating the trial vector further operable to normalize the trial vector to a predetermined magnitude.

17. The apparatus of claim 15, wherein the processor is further operable to calculate the Euclidean distance between each exemplar vector and the trial vector.

18. The apparatus of claim 15, whereby, if the activation value is greater than the first predetermined value, the trial vector is invalid.

19. The apparatus of claim 15, the comparator further operable to:
compare the activation value with a second predetermined value, the second predetermined value being less than the first predetermined value, and if the activation value is less than the second predetermined value, log the activation value and if the activation value is greater than the second predetermined value, initiate a system calibration; and
compare the activation value with a third predetermined value, the third predetermined value being greater than the second predetermined value and less than the first predetermined value, and if the activation value is greater than the third predetermined value, set an alarm.

20. A model for indicating a current state of a system, comprising:
plurality J of n-tuple exemplar vectors stored in a system memory and representative of potential states of a system;
inputs for receiving n current parameter values from a system; and
a routine stored in the memory and adapted to be implemented on a system processor to generate a trial vector from the n parameter values, compare the trial vector with each of the exemplar vectors and output an indication of a current state of the system based on the exemplar vector closest to the trial vector.

21. The model of claim 20, the routine further adapted to normalize the trial vector to a predetermined magnitude.

22. The model of claim 20, wherein the routine is further adapted to compare the trial vector with each of the exemplar vectors by calculating the Euclidean distance between the trial vector and each of the exemplar vectors and identify the exemplar vector K which has the least distance to the trial vector, the least distance comprising an activation value.

23. The model of claim 22, wherein the routine is further adapted to indicate that the trial vector is invalid if the activation value is greater than a first predetermined value.

24. The model of claim 22, wherein the routine is further adapted to:
log the activation value if the activation value is less than a second predetermined value, the second predetermined value being less than the first predetermined value;
initiate a system calibration if the activation value is greater than the second predetermined value; and
set an alarm if the activation value is greater than a third predetermined value, the third predetermined value being greater than the second predetermined value and less than the first predetermined value.

25. The model of claim 20, wherein the exemplar vectors each comprise n components, each component representing a value of a system parameter, assembled into an unprocessed exemplar vector.

26. The model of claim 25, wherein the unprocessed exemplar vectors are processed by being globally conditioned, separated and consolidated.

27. A method for creating exemplar vectors representative of potential states of a system, comprising:

initializing a plurality J of n-tuple unprocessed exemplar vectors with random values;
globally conditioning the J unprocessed exemplar vectors;
separating the conditioned exemplars; and
consolidating the separated exemplar vectors.

28. The method of claim 27, wherein globally conditioning the J unprocessed exemplar vectors comprises:
sequentially applying a plurality M of input vectors to the J unprocessed exemplar vectors;
updating the J unprocessed exemplar vectors by a factor of $\alpha_1$; and
repeating the applying and updating steps over a predetermined number $e_1$ of epochs.

29. The method of claim 27, wherein separating the conditioned vectors comprises:
sequentially applying the plurality M of input vectors to the J conditioned exemplar vectors;
of the J conditioned exemplar vectors, selecting the conditioned exemplar vector which is closest to the currently applied input vector;
updating the selected conditioned exemplar vector and a predetermined number of adjoining conditioned exemplar vectors by a factor of $\alpha_2$; and
repeating the applying, selecting and updating steps over a predetermined number $e_2$ of epochs.

30. The method of claim 27, wherein consolidating the separated vectors comprises:
sequentially applying the plurality M of input vectors to the J separated exemplar vectors;
of the J separated exemplar vectors, selecting the separated exemplar vector which is closest to the currently applied input vector;
updating the selected conditioned exemplar vector by a factor of $\alpha_3$; and
repeating the applying, selecting and updating steps over a predetermined number $e_3$ of epochs.

31. The method of claim 27, further comprising normalizing each unprocessed exemplar vector to a predetermined magnitude.

32. A computer program product of a computer readable medium usable with a programmable computer, the computer program product having computer-readable code embodied therein for detecting a state of a system, the computer-readable code comprising instructions for:
operating the system;
generating an n-tuple trial vector from n parameters representing an actual state of the system;
retrieving a plurality of n-tuple exemplar vectors from a system memory, each exemplar vector representing a potential state of the system; and
of the J exemplar vectors, identifying an exemplar vector K which is closest to the trial vector, the distance from the trial vector to the identified exemplar vector K being an activation value;
whereby, if the activation value is less than a first predetermined value, the actual state of the system is characterized by the exemplar vector K.

33. The computer program product of claim 32, wherein the instructions further comprise instruction for normalizing the trial vector to a predetermined magnitude.

34. The computer program product of claim 32, wherein the instructions for determining which exemplar vector K is closest to the trial vector comprise instructions for calculating the Euclidean distance between each exemplar vector and the trial vector.

35. The computer program product of claim 32, whereby, if the activation value is greater than the first predetermined value, the trial vector is invalid.

36. The computer program product of claim 32, wherein the instructions further comprise instructions for:
- logging the activation value if the activation value is less than a second predetermined value, the second predetermined value being less than the first predetermined value;
- initiating a system calibration if the activation value is greater than the second predetermined value; and
- setting an alarm if the activation value is greater than a third predetermined value, the third predetermined value being greater than the second predetermined value and less than the first predetermined value.

* * * * *